United States Patent [19]

Jean

[11] 4,339,648

[45] * Jul. 13, 1982

[54] PROCESS AND APPARATUS FOR SUBJECTING A MATERIAL TO ELECTROMAGNETIC WAVES

[76] Inventor: Olivier A. L. Jean, "Les Trois Chênes" 14, avenue Béranger, 78600 Maisons Laffitte, France

[*] Notice: The portion of the term of this patent subsequent to Sep. 9, 1997, has been disclaimed.

[21] Appl. No.: 143,350

[22] Filed: Apr. 24, 1980

Related U.S. Application Data

[63] Continuation-in-part of Ser. No. 849,182, Nov. 7, 1977, Pat. No. 4,221,948.

[30] Foreign Application Priority Data

Nov. 17, 1976 [FR] France .............................. 76 34594

[51] Int. Cl.³ ............................................. H05B 6/72
[52] U.S. Cl. ..................... 219/10.55 M; 219/10.55 F; 219/10.55 A
[58] Field of Search ................ 219/10.55 M, 10.55 A, 219/10.55 F, 10.55 R, 10.55 E; 343/968, 785, 895, 854

[56] References Cited

U.S. PATENT DOCUMENTS

| | | | |
|---|---|---|---|
| 2,576,862 | 11/1951 | Smith et al. | 219/10.55 AX |
| 3,092,514 | 6/1963 | Tomberlin | 219/10.55 AX |
| 3,443,051 | 5/1969 | Puschner | 219/10.55 R |
| 3,691,338 | 9/1972 | Chang | 219/10.55 R |
| 3,736,592 | 5/1973 | Coleman | 343/854 |
| 3,980,855 | 9/1976 | Boudouris et al. | 219/10.55 FX |

FOREIGN PATENT DOCUMENTS 2750923 5/1978 Fed. Rep. of Germany ... 219/10.55 F

Primary Examiner—B. A. Reynolds
Assistant Examiner—Philip H. Leung
Attorney, Agent, or Firm—McGlew and Tuttle

[57] ABSTRACT

Apparatus is disclosed for treating dielectric material, which may be solid, liquid or gaseous, with microwaves. The apparatus comprises a cylindrical receptacle for the material and has one or more microwave antennae mounted within the receptacle for radiating microwave energy into the material to be treated. The form of the or each antennae is such that it defines a similar cylinder to the receptacle and is similarly oriented. For example, there may be a single antennae in the form of a rod or helix coaxial with the receptacle, or a plurality of rod-like antennae arranged to lie along respective generatrices of a cylinder surface coaxial with the receptacle. The or each antenna may be hollow and provided with longitudinal slots for radiating the energy. The apparatus provides uniform distribution of the energy along the length of the receptacle.

8 Claims, 7 Drawing Figures

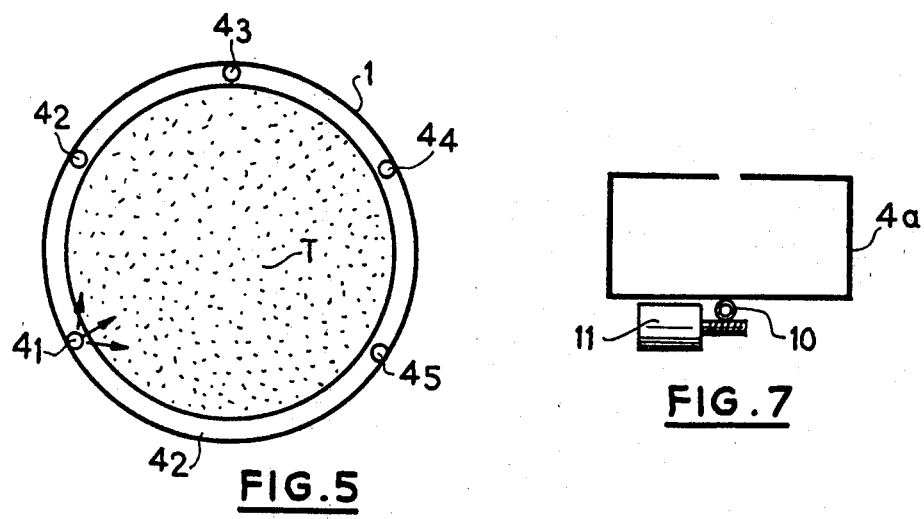
FIG. 5
FIG. 7
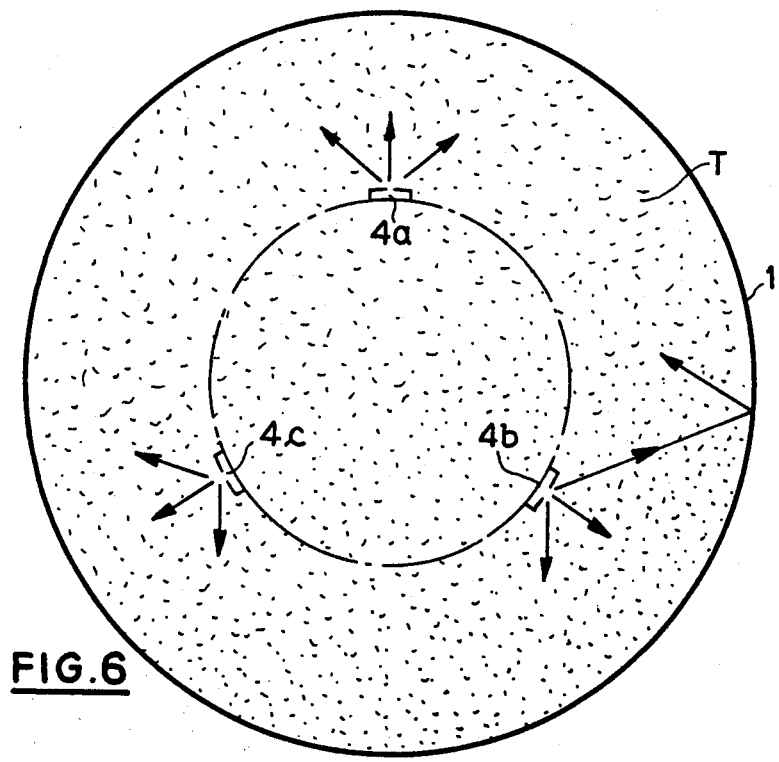
FIG. 6

PROCESS AND APPARATUS FOR SUBJECTING A MATERIAL TO ELECTROMAGNETIC WAVES

This application is a continuation-in-part application to Ser. No. 849,182, filed on Nov. 7, 1977 now issued as U.S. Pat. No. 4,221,948.

BACKGROUND OF THE INVENTION

The present invention relates to apparatus for subjecting a material to electromagnetic waves. Such apparatus, hereinafter referred to as an "applicator", is typically used to treat a confined material, one at least of whose constituents is a dielectric in liquid, solid or even gaseous phase, with electromagnetic waves having a frequency above 1 MHz and preferably above 400 MHz, with a view to supplying it with energy.

Applicators of this type are used in the most varied fields, for example, the treatment of food products, the heating of insulating materials, plastics materials, concrete, rubber and ores, the effecting of polymerizations, desorptions, drying, separations or other physical and chemical actions or reactions which involve one of the constituents of the material or take place between the constituents of the latter.

Applicators using an antenna to radiate electromagnetic energy are known, for example, in high frequency electric ovens. In such an applicator, the antenna is fixed to one of the two extreme right sections of the applicator and radiates towards the corresponding right section of the material to be treated. Such an apparatus is satisfactory in the field of application for which it has been conceived, namely an oven concerned with heating a confined material, within the applicator, in a region whose transverse and longitudinal dimensions are appreciably of the same order.

On the other hand, it prevents grave drawbacks in the case of elaborate industrial applicators, where one is concerned with inducing the aforementioned reactions by carefully proportioned contribution of electromagnetic energy, such as applicators used in the chemical industry. In this case, the dimensions of the applicator are imposed by the conditions of use, that of chemical engineering in the example mentioned. These conditions often involve an important relation between the longitudinal and transverse dimensions of the applicator: its section being most often circular, the latter looks like a true column whose height is equal to several times the diameter, in particular at least twice and generally at least four times.

In these conditions, the supplying of electromagnetic energy through the means of an antenna placed as indicated above, leads to the major drawback of a preferential absorption of this energy in those areas of material to be treated which are nearest the antenna, and consequently to a rapid attentuation of the residual energy available for the treatment of the next areas. In order to supply the necessary minimal energy in the area furthest from the antenna, it is therefore necessary to provide an excess of energy in the nearest areas. This situation leads to overheating in these, if heating is the effect sought, or to the racings of reactions, with all the consequences that that implies, in the case of more elaborate industrial applicators.

It is an object of the present invention to reduce this grave drawback by ensuring for each right section of the applicator an identical contribution of electrical energy, whatever its longitudinal position within the applicator.

SUMMARY OF THE INVENTION

The present invention provides an applicator for subjecting a material to microwaves, comprising a microwave generator, a cylindrical receptacle for the material and an antenna placed in the receptacle and connected to the generator, characterised in that the antenna extends in a notional cylinder having the same axis as the receptacle.

The diagram of radiation of the antenna is then the same in every plane perpendicular to the axis of the applicator. The man skilled in the art will understand that, in such a right section, the path travelled by the waves is clearly shorter than in the case of the prior art apparatus mentioned above. The attenuation of the available residual energy is therefore considerably reduced.

Moreover, the invention allows the efficiency of "energetic recovery" in each right section to be increased by effecting the shape of the diagram of the antenna, the arrangement of the latter in the receptacle and the systematic and controlled use of the receptacle itself as reflector, which use, in the particular case of the invention, offers a certain interest since the available residual energy is far from being negligible.

The notional cylinder in which the antenna extends can be reduced to the axis of the receptacle. The antenna then extends on the axis of the receptacle. The antenna can also have the shape of a helix, especially in the case of a cylindrical receptacle of circular right section, which helix interesects the generatrices of the notional cylinder at a constant angle, homothetic of the receptacle in relations to the axis of the latter. It is advantageous that the antenna and the receptacle exhibit a common symmetry, of the type supplied by a helix.

According to a favourable varient, the antenna extends along a generatrix of the receptacle and, still better, the theoretical diagram of radiation of the antenna is a surface, therefore a curve in a right section, homothetic of the receptacle in relation to the antenna. Thus, the quantity of radiated energy is proportioned to the path of the wave in the material.

To obtain the required homogeneity in the treatment, several transmitter antennae can be distributed angularly around the axis, preferably in an irregular way so that two antennae are not opposite each other. In the case of a column of circular right section, k antennae will be distributed angularly in a regular manner, k being an odd whole number greater than 1 or rather any number of antennae irregularly distributed. It us advantageous that the tangential planes in the diagram of radiation of an antenna do not include another antenna, that is to say that the latter is outside the acute dihedral angle formed by these planes so that the radiation of one antenna does not reach ther other.

The efficiency of the antenna can be improved by placing it in the focal plane of the reflector formed by the interior wall of the receptacle and/or by actuating it with movement, especially of oscillation, around its axis.

Accordingly, the present invention provides for a process for batchwise treating a powdered granulated or fluid material with microwaves. The process consists of entirely filling a receptacle with the material to be treated. The receptacle has a longitudinal axis and is provided with an antenna which extends along a notional cylinder having the same axis as the receptacle. The antenna is made up of a plurality of elements which are able to radiate microwave energy and which is in direct contact with the material to be treated. The antenna radiates microwave energy directly to the material to be treated.

In an embodiment of the invention, the process comprises radiating the microwave energy from the antenna to the material to be treated perpendicularly to the axis.

The present invention also provides for apparatus for treating a powdered, granulated or fluid material by microwaves. The apparatus includes a microwave generator and a receptacle having a longitudinal axis for the material to be treated. The receptacle is entirely filled with the material to be treated. An antenna is connected to the generator. The antenna extends along a notional cylinder having the same axis as the receptacle. The antenna is made up of a plurality of elements able to radiate microwave energy. The antenna is in direct contact with the material to be treated in the receptacle.

In an embodiment of the invention, the antenna radiates perpendicularly to the axis. Also, the antenna can extend along a generatrix of the receptacle.

BRIEF DESCRIPTION OF THE DRAWINGS

In the attached drawings, given solely by way of example:

FIGS. 3 to 6 are views representing the right sections of other variants; and

FIG. 7 is a view in transverse section, on a larger scale, of an antenna used in the applicator of FIG. 6.

DETAILED DESCRIPTION OF THE PREFERRED EMBODIMENTS

Figure 1:
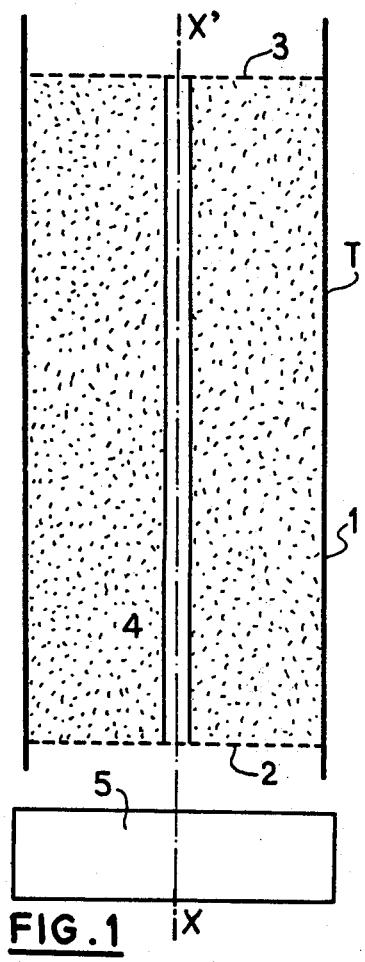
FIG. 1 is a partial diagram of an applicator according to the invention in axial section.

In FIG. 1 a molecular sieve T to be desorbed is placed between two grids 2, 3 of dielectric material in a cylindrical receptacle 1 of circular right section and having a vertical axis XX'. The diameter of the column thus formed is less than a quarter of the height. An antenna 4 stretches along the axis XX' and radiates perpendicularly to the axis XX'. The antenna 4 is connected at one of its ends to a magnetron 5 serving as microwave generator.

Figure 2:
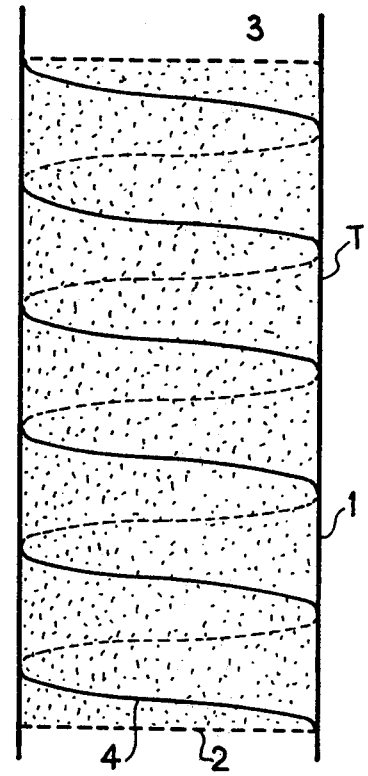
FIG. 2 is a diagram, similar to that of FIG. 1, of a variant.

In FIG. 2, another antenna 4 is shown which extends along a helix inside the receptacle 1.

Figure 3:
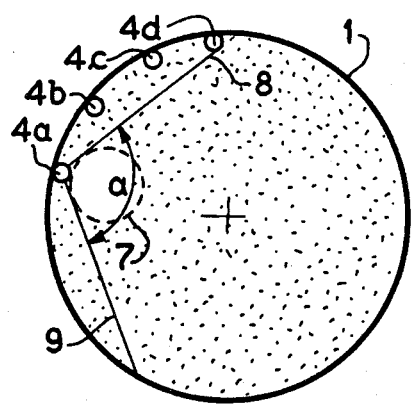

In FIG. 3, four antennae $4a$, $4b$, $4c$, and $4d$ represented schematically by circles extend along generatrices of the cylindrical receptacle 1, which has vertical axis, against the interior wall of the receptacle. The theoretical diagram of radiation of the antenna $4a$ is, in the cross section of the applicator, a circle 7 homothetic of the receptacle 1 in relation to the antenna 4. The antennae $4b$ to $4c$ are outside the angle a delimited by the boundary radii 8 and 9 of the antenna 4.

Figure 4:
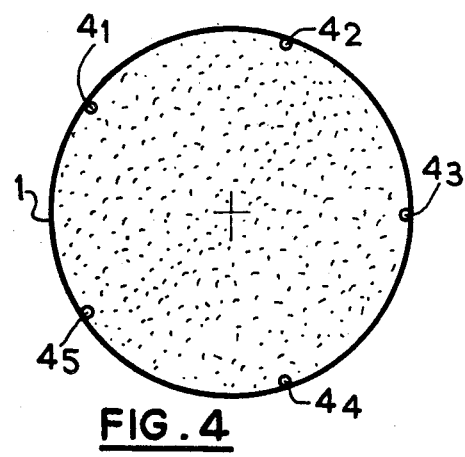

In FIG. 4, five antennae $4_1$ to $4_5$ symbolized by dots are distributed according to a regular pentagon on the generatrices of the receptacle against the interior wall of the latter.

In FIG. 5, six antennae $4_1$ to $4_6$ are distributed according to a regular hexagon on the generatrices of the receptacle 1, against the interior wall of the latter.

In FIG. 6, the whole of the receptacle 1 is filled with material to be treated. Each antenna has many slots which are used as radiating elements. Three antennae $4a$, $4b$, $4c$ with slots have their axes parallel to that of the receptacle 1. The interior wall of the receptacle 1 servies as reflector. To ensure a controllable reflection in a simple way, the antennae are distributed on a cylindrical surface of radius half that of the reflecting envelope of the reflector (and thus at the focal surface of the cylindrical reflector). In the example chosen, the three antennae are at the three apices of an equilateral triangle inscribed in the right section of this focal surface. The efficiency and homogeneity of the "energetic recovery" of each right section of the applicator can, in addition, be increased by causing each antennae to oscillate in an identical and calculated angle around its axis 10 by an apparatus 11 giving a to-and-fro rotation movement to the axis.

The arrangement of the slots of the antennae can, in all cases, be such as to radiate the electromagnetic energy only in one or several, well determined, areas of the applicator, so as to increase the selectivity of the action of this energy.

What we claim is:

1. Process for treating a confined material with microwaves consisting in entirely filling a receptacle with the material to be treated, the receptacle having a longitudinal axis and provided with an entirely internal, fixed antenna which is directly connected to a microwave generator and extends along a notional cylinder having the same axis as the receptacle, which is made with a plurality of elements able to radiate microwave energy, the antenna extending the full height of the material and is in direct contact with the material to be treated and radiating microwave energy from the antenna directly to the material to be treated.

2. The process of claim 1 which consists in radiating microwave energy from the antenna to the material to be treated perpendicularly to said axis.

3. The process of claim 1, wherein said confined material is a molecular sieve.

4. Apparatus for treating a confined material by microwaves comprising a microwave generator, a receptacle having a longitudinal axis for the material to be treated and entirely filled with the material to be treated and an entirely internal, fixed antenna which is directly connected to the generator, which extends along a notional cylinder having the same axis as the receptacle, which is made with a plurality of elements able to radiate microwave energy, the antenna extending the full height of the material and is in direct contact with the material to be treated in the receptacle.

5. The apparatus of claim 4, wherein the antenna radiates perpendicularly to said axis.

6. The apparatus as claimed in claim 5, wherein said antenna extends along a generatrix of the receptacle.

7. The apparatus as claimed in claim 4, wherein said antenna extends along a generatrix of the receptacle.

8. The apparatus as claimed in claim 4, wherein said confined material is a molecular sieve.

* * * * *